United States Patent [19]

Clayfield et al.

[11] Patent Number: 4,734,206

[45] Date of Patent: Mar. 29, 1988

[54] METHOD FOR SEPARATING COAL PARTICLES FROM AN AQUEOUS SLURRY

[75] Inventors: Eric J. Clayfield, Marietta, Ga.; Peter Sant, Bebington, England

[73] Assignee: Shell Oil Company, Houston, Tex.

[21] Appl. No.: 880,343

[22] Filed: Jun. 25, 1986

Related U.S. Application Data

[63] Continuation of Ser. No. 642,307, Aug. 20, 1984, abandoned.

[30] Foreign Application Priority Data

Aug. 23, 1983 [GB] United Kingdom ................. 8322626

[51] Int. Cl.[4] ................................................ C02F 1/54

[52] U.S. Cl. ................................. 210/727; 23/313 R; 44/24; 209/5; 210/729

[58] Field of Search ............. 23/313 R, 314; 44/15 R, 44/24; 209/5; 210/633, 634, 643, 725, 727–729, 737, 806

[56] References Cited

U.S. PATENT DOCUMENTS

| | | | |
|---|---|---|---|
| 1,995,603 | 3/1935 | Cunningham | 210/729 |
| 3,856,668 | 12/1974 | Shubert | 209/5 |
| 3,974,073 | 8/1976 | Sze et al. | 210/806 |
| 4,153,419 | 5/1979 | Clayfield et al. | 44/23 |
| 4,209,301 | 6/1980 | Nicol et al. | 44/24 |
| 4,254,105 | 3/1981 | Fukuda | 424/170 |
| 4,436,618 | 3/1984 | Rigby et al. | 210/729 |

FOREIGN PATENT DOCUMENTS

| | | | |
|---|---|---|---|
| 57-38892 | 3/1982 | Japan | 44/15 R |

*Primary Examiner*—Peter Hruskoci

[57] ABSTRACT

The invention relates, in one embodiment, to a method for separating coal particles from an aqueous slurry in which a multiple emulsion of oil in water is added to the aqueous slurry, the mixture is agitated to form agglomerates of coal particles, and the coal particles are separated from the remaining aqueous slurry. By the use of a multiple emulsion of oil in water, the amount of coal recovered per unit weight of oil is increased.

18 Claims, 2 Drawing Figures

FIG. 1
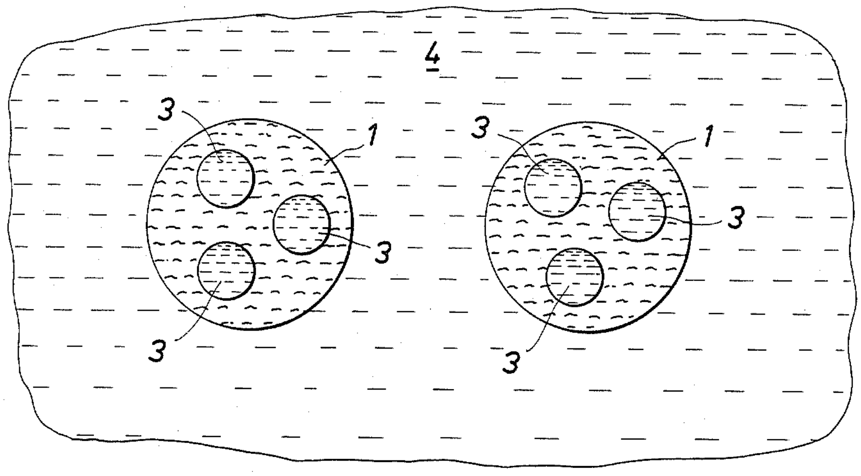
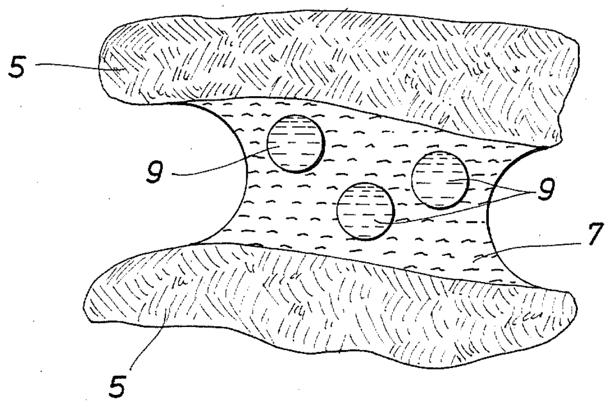
FIG. 2

METHOD FOR SEPARATING COAL PARTICLES FROM AN AQUEOUS SLURRY

This is a continuation of application Ser. No. 642,307, filed Aug. 20, 1984, now abandoned.

BACKGROUND OF THE INVENTION

The invention relates to a method for separating coal particles from an aqueous slurry.

One known method for separating coal particles from an aqueous slurry comprises the steps of addition of a volume of oil to the aqueous slurry, agitation of the mixture of aqueous slurry and oil to form agglomerates of coal particles bound together by oil, and separation of the agglomerates from the slurry.

In order to increase the amount of coal recovered per unit weight of oil used, this known method has been improved. The improved method comprises the steps of dispersing a volume of oil in a volume of water to form a single emulsion of oil in water, adding the single emulsion of oil in water to the aqueous slurry, agitating the mixture of aqueous slurry and single emulsion to form agglomerates of coal particles bound together by oil, and separating the agglomerates from the slurry.

It is the object of the present invention to increase further the amount of coal recovered per unit weight of oil used.

SUMMARY OF THE INVENTION

Accordingly, the invention comprises a method of separating coal particles from an aqueous slurry comprising (a) forming a volume of a multiple emulsion of oil in water;

(b) adding at least a portion of the multiple emulsion to the aqueous slurry;

(c) agitating the mixture of the multiple emulsion and the aqueous slurry to form agglomerates of coal particles; and (d) separating the agglomerates of coal particles from the remaining aqueous slurry.

As used in this specification and claims, the expression "multiple emulsion" refers to an emulsion in which the continuous phase is also present, as smaller droplets, in the droplets of the other liquid which are dispersed in the continuous phase.

It will be appreciated that the method according to the invention may also be used for separating ash from coal particles.

BRIEF DESCRIPTION OF THE DRAWINGS

The invention will now be described by way of example with reference to the drawings, wherein FIG. 1 shows schematically two droplets of a multiple emulsion of oil in water; and FIG. 2 shows schematically an agglomerate of two coal particles.

According to the first step of the invention, a multiple emulsion of oil and water is formed wherein oil droplets (1) (see FIG. 1), having smaller water droplets (3) dispersed therein, are dispersed in a volume of water (4). Since the continuous phase (the water) of the multiple emulsion is present as smaller droplets (3) in the oil droplets (1), the multiple emulsion of oil in water may be referred to as a water-in-oil in water emulsion.

The multiple emulsion of oil in water is subsequently added to an aqueous slurry of coal particles, and the mixture of multiple emulsion and aqueous slurry is agitated to form agglomerates of coal particles. FIG. 2 shows an example of such an agglomerate, comprising two coal particles (5) bonded by a quantity of oil (7) which contains small water droplets (9) distributed uniformly therein.

The agglomerates of coal particles, having in general diameters in the range of from 0.05 to 5 cm, can easily be separated from the remaining aqueous slurry, for example by means of centrifuge or a sieve. The separated agglomerates can be used as a fuel or fuel components.

The above described multiple emulsion of oil in water is formed in two stages. A volume of water is first dispersed in a volume of oil to form a water-in-oil emulsion, and subsequently the water-in-oil emulsion is dispersed in a volume of water to form the multiple emulsion of oil in water.

The oil fraction of the multiple emulsion can comprise any type of oil, for example shale oil, mineral oil, or tar. The weight of the oil fraction in the multiple emulsion of oil in water is in the range of from 1 to 10 percent of the weight of the coal particles in the aqueous slurry.

The volume of water added to the volume of oil to form the water-in-oil emulsion is at most 60 percent of the volume of the mixture of water and oil. The volume of water to which the water-in-oil emulsion is added, in order to form the multiple emulsion, is in the range of from 40 to 60 percent of the volume of the multiple emulsion.

In order to increase the ease of formation of an emulsion as well as to stabilize the emulsion formed, a plurality of emulsifying agents can be used. The emulsifying agents can be divided in two groups: emulsifying agents having a strong affinity for oil which can be used to disperse water in oil, and emulsifying agents having a strong affinity for water which can be used to disperse the water-in-oil emulsion in water.

Emulsifying agents having a strong affinity for oil have a hydrophilic-lipophilic balance number, a number indicating the relative simultaneous affinity of the emulsifying agent to water and to oil, in the range of from 1.5 to 6. An example of such an emulsifying agent is 1-amino ethyl,2-alkenyl (C 17 unsaturated) imidazoline.

Emulsifying agents having a strong affinity for water comprise $C_9$–$C_{16}$ primary alcohol ethoxylates or alkali metal sulfates or sulfonates of aliphatic or alkyl compounds selected from sodium $C_8$–$C_{20}$ alkylbenzene sulfonates, sodium $C_8$–$C_{20}$ alkyl sulfates, and sodium $C_8$–$C_{18}$ secondary sulfates. These emulsifying agents have a hydrophilic-lipophilic balance number in the range of from 10 to 16.

The volume of emulsifying agent added to the mixture of oil and water to form the water-in-oil emulsion, or the volume of emulsifying agent added to the mixture of water and water-in-oil emulsion to form the multiple emulsion is in the range of from 0.01 to 10 percent by volume of the mixture to which the emulsifying agent is added.

In another embodiment of the invention, the above described process for separating coil particles from an aqueous slurry of coal particles is carried out in two subsequent stages. The first stage of this two-stage process comprises the steps of forming a first volume of a multiple emulsion of oil in water, adding at least a portion, preferably the major portion of the first volume of the multiple emulsion to the aqueous slurry, agitating the mixture of multiple emulsion and aqueous slurry to form agglomerates of coal particles, and separating the agglomerates of coal particles from the remaining aqueous slurry. The second stage comprises the steps of forming a second volume of a multiple emulsion of oil in water, adding at least a portion of the second volume of the multiple emulsion to the remaining aqueous slurry, agitating the mixture of multiple emulsion and remaining aqueous slurry to form agglomerates of coal particles, and removing the agglomerates from the mixture.

The multiple emulsion of oil in water is formed as described hereinabove. The weight of the oil fraction in the first volume of multiple emulsion is in the range of from 10 to 80 percent of the total weight of the oil fraction in the first and second volume of multiple emulsion together. The total weight of the oil fraction is in the range of from 1 to 10 percent of the weight of the coal particles in the aqueous slurry.

In a further embodiment of the invention, the first step of the first stage comprises preparing a large volume of multiple emulsion. Of this large volume, a fraction is added to the aqueous slurry in the first stage, and at least a portion, preferably in the rest of the large volume, is added to the remaining aqueous slurry in the second stage. In this embodiment of the invention, the first step of the second stage, i.e., forming a second volume of multiple emulsion of oil in water, can be omitted.

The two-stage process results in an unexpectedly high coal recovery per unit weight of oil used as compared to the single stage process as described with reference to FIGS. 1 and 2. However, adding more stages to the two-stage process will not result in a further increase in the coal recovery per unit weight of oil.

It has been found that a further significant increase in the amount of coal recovered per unit weight of oil used can be obtained when the mixture of liquids forming the multiple emulsion of oil in water is heated to a temperature in the range of from 25° C. to 95° C. during formation of the multiple emulsion. Observations of the multiple emulsion of oil in water have shown that the droplet diameter of the oil droplets, with smaller water droplets dispersed therein, decreased with increasing temperature. Consequently, the number of oil droplets per unit weight of oil increased. It is believed that this resulted in an increase in the number of agglomerates and that thus the amount of coal recovered per unit weight of oil used increased.

To demonstrate the effect of the method for separating coal particles from an aqueous slurry according to the invention, two series of three experiments have been carried out, wherein coal particles were separated from an aqueous slurry in two stages. In these experiments, quantities of 10 kg. of an aqueous slurry containing 1 kg. of coal particles, having diameters less than 0.7 mm and an ash content of about 2.4 percent of the weight of the dry coal, were treated with 0.03 kg. mineral oil. In the first series of three experiments, a 10S long residue mineral oil was used, and in the second series a visbroken residue mineral oil. The experiments will be described with reference to the following Table.

TABLE

Coal recovery from a 10 kg. aqueous slurry comprising 1 kg. of coal particles, treated with 0.03 kg. mineral oil

| Type of mineral oil | Experiment number | Type of emulsion | Average droplet diameter (mm) | Coal recovery (kg) |
|---|---|---|---|---|
| 10S long | 1 | single | 0.018 | 0.46 |
| residue | 2 | multiple | 0.016 | 0.64 |
| | 3 | multiple | 0.012 | 0.85 |
| visbroken | 4 | single | 0.020 | 0.48 |
| residue | 5 | multiple | 0.019 | 0.66 |
| | 6 | multiple | 0.012 | 0.84 |

In the first experiments of each series, the experiments 1 and 4, a single emulsion of oil in water was used. The single emulsion was prepared by mixing 0.03 kg of mineral oil and a volume of water equal to the volume of the mineral oil. Additionally, a volume of Teepol 610 (trademark) equal to 0.3 percent of the volume of the mixture was added to the mixture of oil and water. Teepol 610 (trademark), an emulsifying agent having a strong affinity to water, is a mixture of sodium $C_8$–$C_{18}$ secondary alkyl sulfates, and has a hydrophilic-lipophilic balance number equal to 13.

In the second and third experiments of each series, the experiments 2 and 3, as well as 5 and 6, multiple emulsions of oil in water were used. These multiple emulsions were formed by dispersing a water-in-oil emulsion, comprising 0.03 kg. of mineral oil and a volume of water equal to the volume of mineral oil, in a volume of water equal to the volume of the water-in-oil emulsion.

To form the water-in-oil emulsion, a volume of Casamine R (trademark) equal to 1.0 percent of the volume of the mixture was added to the mixture of water and oil. Casamine R (trademark), an emulsifying agent having a strong affinity for oil, is 1-amino ethyl,2-alkenyl (C 17 unsaturated) imidazoline, and has a hydrophilic-lipophilic balance number of about 2. Moreover, to disperse the water-in-oil emulsion, a volume of the above described Teepol 610 (trademark) equal to 0.3 percent of the volume of the mixture was added to the mixture of the water-in-oil emulsion and the water.

The single emulsions used in the experiments 1 and 4, as well as the multiple emulsions used in the experiments 2 and 5, were prepared at 60° C., and the multiple emulsions used in the experiments 3 and 6 were prepared at a temperature of 85° C. For each of the six emulsions the distribution of the droplet diameters was determined. It appeared that the average droplet diameters of the four emulsions prepared at 60° C. have about the same magnitude, but that the average droplet diameters of the two emulsions prepared at 85° C. are significantly smaller than the average droplet diameters of the emulsions prepared at 60° C.

In the first stage of all the experiments, a first volume of the emulsion (a single emulsion for the experiment 1 or 4, or a multiple emulsion for the experiments 2, 3, 5 or 6) comprising 0.015 kg. of oil was added to the aqueous slurry. The mixture of emulsion and aqueous slurry was agitated for about two minutes by a turbine mixer having six flat blades and rotating at about 350 revolutions per minute. Thereupon, the agglomerates having a diameter larger than 0.25 mm were separated from the remaining slurry by sieving. In the second stage, a second volume of the emulsion comprising 0.015 kg of oil was added to the remaining slurry, and the mixture was agitated for about two minutes by a turbine mixer having six flat blades and rotating at about 350 revolutions per minute. The agglomerates having a diameter larger than 0.25 mm were then removed from the mixture. The total amount of coal recovered for each of the emulsions is listed in the Table.

It may be seen from the Table that in the experiments wherein the multiple emulsion was used, a larger amount of coal was recovered than in the experiments wherein a single emulsion was used, and that reducing the average droplet diameter resulted in an even larger amount of coal recovered using the same amount of oil.

What is claimed is:

1. A process for separating coal particles from an aqueous slurry of coal in water comprising (a) forming a volume of a multiple emulsion of oil in water;

(b) adding multiple emulsion to an aqueous slurry of coal in water, and forming a mixture of multiple emulsion and aqueous slurry;

(c) agitating the mixture of the multiple emulsion and the aqueous slurry to form agglomerates of coal particles and a remaining slurry mixture; and (d) separating the agglomerates of coal particles from the remaining slurry mixture.

2. The process of claim 1 wherein the multiple emulsion is formed by dispersing a volume of water in a volume of oil to form a water-in-oil emulsion, and the water-in-oil emulsion is then dispersed in a volume of water.

3. The process of claim 2 in which an emulsifying agent having a hydrophilic-lipophilic balance number in the range of from 1.5 to 6 is added to the mixture of oil and water to form the water-in-oil emulsion.

4. The process of claim 2 in which an emulsifying agent having a hydrophilic-lipophilic balance number in the range of from 10 to 16 is added to the mixture of water and water-in-oil emulsion to form the multiple emulsion.

5. The process of claim 4 in which the emulsifying agent consists of $C_9$–$C_{16}$ primary alcohol ethoxylates or alkali metal sulfates or sulfonates of aliphatic or alkyl compounds selected from sodium $C_8$–$C_{20}$ alkylbenzene sulfonates, sodium $C_8$–$C_{20}$ alkyl sulfates, and sodium $C_8$–$C_{18}$ secondary sulfates.

6. A process for separating coal particles from an aqueous slurry of coal in water comprising (a) forming first and second multiple emulsions of oil in water;

(b) adding first multiple emulsion to an aqueous slurry of coal in water, and forming a mixture of first multiple emulsion and aqueous slurry;

(c) agitating the mixture of the first multiple emulsion and the aqueous slurry to form agglomerates of coal and a remaining slurry mixture;

(d) separating the agglomerates of coal particles from the remaining slurry mixture;

(e) adding second multiple emulsion to the remaining slurry mixture, and forming an admixture of second multiple emulsion and remaining slurry mixture;

(f) agitating the admixture of second multiple emulsion and remaining slurry mixture to form agglomerates of coal particles; and (g) removing the agglomerates from the admixture.

7. The process of claim 6 wherein the multiple emulsion is formed by dispersing a volume of water in a volume of oil to form a water-in-oil emulsion, and the water-in-oil emulsion is then dispersed in a volume of water.

8. The process of claim 7 in which an emulsifying agent having a hydrophilic-lipophilic balance number in the range of from 1.5 to 6 is added to the mixture of oil and water to form the water-in-oil emulsion.

9. The process of claim 8 wherein the volume of water in the water-in-oil emulsion is at most 60 percent of the volume of the water-in-oil emulsion.

10. The process of claim 8 in which the emulsifying agent consists of $C_9$–$C_{16}$ primary alcohol ethoxylates or alkali metal sulfates or sulfonates of aliphatic or alkyl compounds selected from sodium $C_8$–$C_{20}$ alkylbenzene sulfonates, sodium $C_8$–$C_{20}$ alkyl sulfates, and sodium $C_8$–$C_{18}$ secondary sulfates.

11. The process of claim 7 in which an emulsifying agent having a hydrophilic-lipophilic balance number in the range of from 10 to 16 is added to the mixture of water and water-in-oil emulsion to form the multiple emulsion.

12. A process for separating coal particles from an aqueous slurry of coal in water comprising (a) forming a volume of a multiple emulsion of oil in water, and dividing the volume of multiple emulsion in water into first and second portions of multiple emulsion in water;

(b) adding first portion of multiple emulsion to an aqueous slurry of coal in water, and forming a mixture of multiple emulsion and aqueous slurry;

(c) agitating the mixture of the multiple emulsion and aqueous slurry to form agglomerates of coal and a remaining slurry mixture;

(d) separating the agglomerates of coal particles from the remaining slurry mixture;

(e) adding second portion of multiple emulsion to the remaining slurry mixture, and forming an admixture of multiple emulsion and remaining slurry mixture;

(f) agitating the admixture of multiple emulsion and remaining slurry mixture to form agglomerates of coal particles; and (g) removing the agglomerates from the admixture.

13. The process of claim 12 wherein the multiple emulsion is formed by dispersing a volume of water in a volume of oil to form a water-in-oil emulsion, and the water-in-oil emulsion is then dispersed in a volume of water.

14. The process of claim 13 wherein the volume of water in the water-in-oil emulsion is at most 60 percent of the volume of the water-in-oil emulsion.

15. The process of claim 14 in which an emulsifying agent having a hydrophilic-lipophilic balance number in the range of from 1.5 to 6 is added to the mixture of oil and water to form the water-in-oil emulsion.

16. The process of claim 13 in which an emulsifying agent having a hydrophilic-lipophilic balance number in the range of from 10 to 16 is added to the mixture of water and water-in-oil emulsion to form the multiple emulsion.

17. The process of claim 16 in which the emulsifying agent consists of $C_9$–$C_{16}$ primary alcohol ethoxylates or alkali metal sulfates or sulfonates of aliphatic or alkyl compounds selected from sodium $C_8$–$C_{20}$ alkylbenzene sulfonates, sodium $C_8$–$C_{20}$ alkyl sulfates, and sodium $C_8$–$C_{18}$ secondary sulfates.

18. A process for separating coal particles from an aqueous slurry of coal in water comprising (a) forming a volume of a multiple emulsion of oil in water by dispersing a volume of water in oil, utilizing an emulsifying agent having a hydrophilic-lipophilic balance number in the range of from 1.5 to 6, to form a water-in-oil emulsion, the volume of water in the water-in-oil emulsion being at most 60 percent by volume of the water-in-oil emulsion, and then dispersing the water-in-oil emulsion in a volume of water;

(b) adding multiple emulsion to an aqueous slurry of coal in water, and forming a mixture of multiple emulsion and aqueous slurry;

(c) agitating the mixture of the multiple emulsion and the aqueous slurry to form agglomerates of coal particles and a remaining slurry mixture; and (d) separating the agglomerates of coal particles from the remaining slurry mixture.

* * * * *